United States Patent [19]

Grieves et al.

[11] Patent Number: 4,623,702

[45] Date of Patent: Nov. 18, 1986

[54] TWO-COMPONENT ADHESIVE OR SEALING COMPOSITION

[75] Inventors: Richard Grieves, Hillbrow; Kimleigh G. M. Pratley, Krugersdorp, both of South Africa

[73] Assignee: Pratley Investments Limited, Transvaal, South Africa

[21] Appl. No.: 679,752

[22] Filed: Dec. 10, 1984

[30] Foreign Application Priority Data

Mar. 19, 1984 [ZA] South Africa ..................... 84/2012

[51] Int. Cl.$^4$ ............................................. C08L 63/02
[52] U.S. Cl. .................................... 525/528; 525/454; 525/523
[58] Field of Search ................ 525/528, 454, 535, 939

[56] References Cited

U.S. PATENT DOCUMENTS 4,388,426  6/1983  Schure et al. ....................... 525/423

FOREIGN PATENT DOCUMENTS 024501  11/1981  European Pat. Off. .

*Primary Examiner*—Theodore E. Pertilla
*Attorney, Agent, or Firm*—Ladas & Parry

[57] ABSTRACT

A two-component adhesive or sealing system which comprises a mixture of two components, a first component comprising a mixture of a constituent (a) being an amine curable epoxy resin, and a constituent (b) being an isocyanate prepolymer with ether and blocked urethane groups, wherein the amount of constituent (a) comprises from 29 to 52 percent by weight of the total weight of constituents (a) and (b), and the amount of constituent (b) comprises from 48 to 71 percent by weight of the total weight of constituents (a) and (b), and a second component comprising a mixture of constituent (c) being a suitable amine hardener, constituent (d) being a tertiary amine as a primary accelerator, and constituent (e) being a mercaptan terminated polymer such as Capcure 3-800 as secondary accelerator, wherein the amount of constituent (c) comprises from 0.3 to 47 percent by weight of the total weight of constituent (a) and (b), the amount of constituent (d) comprises 1 to 27 percent by weight of the total weight of the constituents (a) and (b), and the amount of constituent (e) comprises 21 to 328 percent by weight of the total weight of constituents (c) and (d). The first component and the second component are blended together in a ratio of approximately 2 to 1 to form the adhesive or sealing composition.

14 Claims, No Drawings

TWO-COMPONENT ADHESIVE OR SEALING COMPOSITION

BACKGROUND OF THE INVENTION

This invention relates to a two-component adhesive or sealing composition, the first component comprising an epoxy resin and an isocyanate pre-polymer with ether and blocked urethane groups, and the second component comprising a suitable amine hardener, a tertiary amine primary accelerator and a mercaptan terminated polymer as a secondary accelerator, such as Capcure 3-800.

Many adhesive compositions, based on epoxy reins, are known. These compositions generally are two-component compositions, the first component including the epoxy resin and the second component including a hardener for the epoxy resin. When the two components are blended together, the epoxy resin hardens and sets. Capcure 3-800 made by Diamond Shamrock Corporation, is an accelerator or hardener which is known to impart rapid cure characteristics to epoxy reins, in combination with selected amines. However, Capcure 3-800 is generally not known as a hardener or accelerator for any other type of resin system, such as the resin system of the invention. European Patent Application No. 0 024 501 in the name of Teroson GmbH discloses a two-component polyurethane sealing composition for use in sealing glass into window frames and the like. The first component of this composition comprises 10 to 50 percent by weight of linear or branched polymers with ether and urethane groups as well as cross-linkable blocked isocyanate groups, 0 to 15 percent by weight of epoxy resin, 0.1 to 2.5 percent by weight of trialkoxy silane, 2 to 25 percent by weight of plasticiser and optionally 0.5 to 5 percent by weight of a thixotropic agent.

The first component is stated to contain 0 to 15 percent by weight of epoxy resin. However, the first component also contains various non-reactive plasticisers and fillers. Adjusting the percentage of epoxy resin so that the percentage is based solely on the percentage of the polymer with ether and urethane groups and blocked isocyanate groups in the first component, the maximum percentage of epoxy resin disclosed in the specification in Example 6, is 33 percent by weight of the total weight of the epoxy resin and the polymer.

The second component of this sealing composition contains a cycloaliphatic diamine as a hardener and a tertiary amine or amine derivative as an accelerator. Further, in the specification it is stated that it is advantageous to add to the second component a low viscosity polymercaptan resin such as Capcure 3-800 in quantities of about 5 to 20 percent by weight related to the second component. It is stated that this additive has two advantages. It increases the mechanical strength of the overall compound and makes it more viscoplastic when it has hardened. There are no examples in the patent application which illustrate the use of Capcure 3-800. The amount of Capsure 3-800 specified in this patent application is outside the range of amounts of the mercaptan terminated polymer which is used in the second component of the composition of the present invention.

SUMMARY OF THE INVENTION

According to the invention there is provided a composition, comprising two components as a mixture, comprises:

a first component comprising a mixture of a constituent (a) being an amine curable epoxy resin, and a constituent (b) being an isocyanate pre-polymer with ether and blocked urethane groups, wherein the amount of constituent (a) comprises from 29 to 52 percent by weight of the total weight of constituents (a) and (b), and the amount of constituent (b) comprises from 48 to 71 percent by weight of the total weight of constituents (a) and (b), and a second component comprising a mixture of a constituent (c) being a suitable amine hardener, a constituent (d) being a tertiary amine as a primary accelerator, and a constituent (e) being a mercaptan terminated polymer as secondary accelerator, wherein the amount of constituent (c) comprises from 0.3 to 47 percent by weight of the total weight of constituents (a) and (b), the amount of constituent (d) comprises from 1 to 27 percent by weight of the total weight of the constituents (a) and (b), and the amount of constituent (e) comprises from 21 to 328 percent by weight of the total weight of constituents (c) and (d), the first component and the second component being blendable together to form an adhesive or sealing composition.

The amount of constituent (e) in the second component preferably comprises 63 to 293 percent, more preferably 90 to 230 percent by weight of the total weight of the constituents (c) and (d).

DETAILED DESCRIPTION OF THE INVENTION

The first component of the system comprises constituent (a) being an amine curable epoxy resin and constituent (b) being an isocyanate pre-polymer with ether and blocked urethane groups.

Preferably, the amine curable epoxy resin is one made from bisphenol A and epichlorohydrin. A particularly suitable epoxy resin is Epikote 828, sold by Shell Chemicals.

As stated above, constituent (b) of the first component is an isocyanate pre-polymer with ether and blocked urethane groups. Examples of such polymers are Desmocap 11, Desmocap 1180 and Desmocap 1280, sold by Bayer AG. Desmocap 11 is a branched polymer with ether and blocked urethane groups, which contains 2.4 percent of cross-linkable blocked NCO-groups, the blocking agents being phenols and in particular nonyl phenol, in a quantity of about 4 to 6 percent. A corresponding product is Desmocap 1180 which differs from Desmocap 11 in that, in addition, it contains 20 percent of trioctyl phosphate for reducing the viscosity. Desmocap 1280 is a linear polymer with ether and blocked urethane groups, which contains 1.4 percent of cross-linkable blocked isocyanate groups and which also contains 20 percent of trioctyl phosphate. Constituent (b) is preferably Desmocap 11.

The amount of constituent (a) in the first component preferably comprises 34 to 45 percent by weight of the total weight of constituents (a) and (b) and the amount of constituent (b) in the first component preferably comprises 55 to 66 percent by weight of the total weight of constituents (a) and (b). More preferably, the amount of constituent (a) in the first component comprises approximately 40 percent by weight of the total weight of constituents (a) and (b) and the amount of constituent (b) in the first component comprises approximately 60 percent by weight of the total weight of constituents (a) and (b).

The first component may also contain a suitable plasticiser. Suitable plasticisers include diisodecyl phthalate, Santicizer 278 (UCC), Witamol 600 (Dynamit-Nobel), polybutenes, reactive liquid polybutadienes, trioctyl phosphate, benzyl butyl phthalate, and dibutyl phthalate. The first component may also contain a filler.

Constituent (c) of the second component of the system of the invention is a suitable amine hardener. Examples of suitable amine hardeners are:

(a) a cycloaliphatic diamine such as 3,3-dimethyl-4,4-diamino dicyclohexyl methane sold as Laromin C260 by BASF AG, or N-cyclohexyl propylene diamine sold as Laromin C252 by BASF AG;
(b) isophorone diamine;
(c) trimethyl hexamethylene diamine;
(d) bis(amino propyl)piperazine;
(e) diethylene triamine;
(f) triethylene tetraamine;
(g) mixtures and adducts of isophorone diamine, diethylene triamine and triethylene tetraamine; and
(h) a compound of a cycloaliphatic diamine with alkyl phenol, such as Laromin Z172 sold by BASF AG.

When constituent (c) is selected from any one of compounds (a) to (g) above, an "effective amount" of constituent (c) is an amount up to 20 percent by weight, preferably 0.3 to 16.7 percent by weight, more preferably 6 to 7 percent by weight of the total weight of constituents (a) and (b).

When constituent (c) comprises a compound (h) above, an "effective amount" of constituent (c) is an amount of up to 47 percent by weight, preferably 0.3 to 43.3 percent by weight, more preferably 10 to 20 percent by weight of the total weight of constituents (a) and (b).

Constituent (d) of the second component of the system of the invention is a tertiary amine as a primary accelerator. Examples of suitable tertiary amines are 2,4,6-tri(dimethylaminomethyl)phenol sold as DMP 30 by Rohm and Haas, or dimethylaminomethyl phenol sold as DMP 10 by Rohm and Haas.

The amount of constituent (d) in the second component may comprise 1 to 27 percent by weight of the total weight of the constituents (a) and (b). Preferably the amount of constituent (d) is the second component comprises 3 to 27 percent by weight, more preferably 6 to 8 percent by weight of the total weight of the constituents (a) and (b).

Constituent (e) of the second component of the system of the invention is a mercaptan terminated polymer as a secondary accelerator. Preferably, the constituent (e) is a short chain mercaptan terminated polymer with the general structure

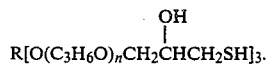

Examples of these compounds include Capcure 3-800 sold by Diamond Shamrock Corporation, Capcure WR6 and Capcure WR35 also sold by Diamond Shamrock Corporation, Yukacure QX10 sold by Mitsubishi Chemicals, XE 90 sold by Shering Company an Casamid SP 232/500 sold by Thomas Swan. The compound is preferably Capcure 3-800.

The second component may contain an amount of constituent (e) which comprises 21 to 328 percent by weight of the total weight of constituents (c) and (d). Preferably, the amount of constituent (e) in the second component comprises 63 to 293 percent by weight, more preferably 90 to 230 percent by weight of the total weight of constituents (c) and (d).

A preferred two-component system of the invention comprises:

a first component comprising a mixture of constituent (a) being Epikote 828 and constituent (b) being Desmocap 11, wherein the amount of constituent (a) comprises approximately 40 percent by weight of the total weight of constituents (a) and (b), and the amount of constituent (b) comprises approximately 60 percent by weight of the total weight of the constituents (a) and (b), and a second component comprising a mixture of constituent (c) being Laromin Z172, constituent (d) being DMP30 and constituent (e) being Capcure 3-800, wherein the amount of constituent (c) comprises approximately 14.7 percent by weight of the total weight of constituents (a) and (b), the amount of constituent (d) comprises approximately 7.7 percent by weight of the total weight of constituents (a) and (b), and the amount of constituent (e) comprises approximately 90 percent by weight of the total weight of constituents (c) and (d).

Another preferred two-component system of the invention comprises: a first component comprising a mixture of constituent (a) being Epikote 828 and constituent (b) being Desmocap 11, wherein the amount of constituent (a) comprises approximately 40 percent by weight of the total weight of constituents (a) and (b), and the amount of constituent (b) comprises approximately 60 percent by weight of the total weight of the constituents (a) and (b), and a second component comprising a mixture of constituent (c) being Laromin C260, constituent (d) being DMP30 and constituent (e) being Capcure 3-800, wherein the amount of constituent (c) comprises approximately 6.7 percent by weight of the total weight of constituents (a) and (b), the amount of constituent (d) comprises approximately 7.7 percent by weight of the total weight of constituents (a) and (b), and the amount of constituent (e) comprises approximately 139.5 percent by weight of the total weight of constituents (c) and (d).

In use the first and second components are mixed or blended together in a ratio of 2.5:1 to 3.5:1 preferably 2.9:1.

EXAMPLE

An example will now be given illustrating the effect of Capcure 3-800 on the system of the invention.

Various compositions were formulated containing varying amounts of Capcure 3-800. These compositions contained the following:

Epikote 828—6 g
Desmocap 11—9 g
Laromin C260—1 g
DMP 30—1.15 g
Capcure 3-800—0 to 7.5 g The compositions were then subjected to the following tests:

Gel Time

Gel time is determined by taking the time in minutes for 15 g of the composition when spread out to a depth of 2 mm to be cured to a degree such that no "stringing" occurs when the reaction mass is touched with a wooden spatula, at a temperature of 24° C.

Percentage Elongation at Break

Percentage elongation at break is determined on a dumb-bell, after the composition is cured for 24 hours at ambient temperatures. The elongation is observed on two marks marked 15 mm apart on the narrow section of the dumb-bell. The dumb-bell is pulled at 508 mm per minute.

Tensile Strength

Tensile strength is determined as above on a dumb-bell pulled at 508 mm per minute on a Monsanto W. Tensometer.

Butt Tensile Adhesive Strength

Butt tensile adhesive strength is determined on steel-to-steel test pieces pulled at 50.8 mm per minute on a Monsanto W. Tensometer.

Percentage Tensile Set at Break

Percentage tensile set at break is determined on a dumb-bell as per ASTM D412, Section 5.5.

Percentage Tensile Set at 50% Elongation

Percentage tensile set at 50 percent elongation is determined on a dumb-bell as per ASTM D412, Section 5.4. Ten minutes extended, extension attained within 17 seconds and 10 minutes at rest before measuring set.

The results of these tests are given in Table I.

TABLE I

| A | B | C | D | E | F | G | H |
|---|---|---|---|---|---|---|---|
| NIL | 0 | 247 | 60 | 12.2 | 34.5 | 37 | 24.3 |
| 11.6 | 0.25 | 180 | 45.3 | 11.7 | 32.9 | 36 | 25.8 |
| 14 | 0.3 | 183 | 50.1 | 11.6 | 32.9 | 35½ | 25.8 |
| 16.3 | 0.35 | 183 | 47.5 | 11.5 | 28.1 | 35 | 27.2 |
| 18.6 | 0.4 | 143 | 34.7 | 10.2 | 27.5 | 34 | 25.2 |
| 20 | 0.43 | 177 | 41.2 | 11.6 | 27.1 | 34 | 26.3 |
| 20.9 | 0.45 | 183 | 39.6 | 11.1 | 24.5 | 34 | 25.7 |
| 23.3 | 0.5 | 167 | 38.4 | 11.6 | 21 | 32½ | 26.0 |
| 34.9 | 0.75 | 200 | 44.2 | 12.5 | 19.2 | 31½ | 25.2 |
| 46.5 | 1 | 170 | 29.3 | 12.9 | 17.4 | 31½ | 23.8 |
| 48.8 | 1.05 | 213 | 27.6 | 11.4 | 13.9 | 31½ | 21.0 |
| 52.1 | 1.12 | 113 | — | 10.1 | 11.4 | 31½ | 19.5 |
| 53.5 | 1.15 | 183 | 23.5 | 11.3 | 10.0 | 31½ | 24.0 |
| 55.8 | 1.2 | 200 | 19.1 | 11.3 | 11.9 | 31½ | 21 |
| 62.8 | 1.35 | 107 | 10.5 | 10.0 | 8.0 | 31 | 21.3 |
| 69.8 | 1.5 | 148 | 11.7 | 11.2 | 8.0 | 30 | 20.3 |
| 76.7 | 1.65 | 100 | 9.5 | 10.8 | 9.3 | 28 | 21.0 |
| 83.7 | 1.8 | 123 | 9.2 | 10.7 | 8.1 | 26 | 23.8 |
| 93 | 2 | 93 | 6.8 | 10.7 | 6.0 | 26 | |
| 139.5 | 3 | 97 | 4.3 | 10.8 | 4.8 | 18½ | 18.3 |
| 209.3 | 4.5 | 83 | 6.1 | 10.4 | 3.2 | 15 | 18.5 |
| 223.3 | 4.8 | 90 | 6.4 | 10.9 | | 15 | 13.8 |
| 230.2 | 4.95 | 89 | 4.1 | 11.5 | 4.7 | 15 | 17.7 |
| 237.2 | 5.1 | 65 | 7.0 | 10.7 | 4.8 | 15 | 14.2 |
| 244.2 | 5.25 | 64 | 4.7 | 10.5 | | 14½ | 12.3 |
| 258.1 | 5.55 | 50 | 3.8 | 10.1 | | 14½ | 13.4 |
| 272.1 | 5.85 | 48 | 2.8 | 10.4 | | 14 | 13.7 |
| 279.1 | 6.75 | 4.1 | 9.5 | | | 14 | 12.7 |
| 286 | 6.15 | 72 | 4.0 | 10.4 | | 13 | 12.8 |
| 293 | 6.3 | 53 | 1.7 | 9.2 | | 13 | 13.6 |
| 300 | 6.45 | 75 | 3.6 | 8.0 | | 12½ | 12.7 |
| 307 | 6.6 | 67 | 6.3 | 8.6 | | 12 | 11.3 |
| 314 | 6.75 | 68 | 2.7 | 7.8 | | 11½ | 13.1 |
| 320.9 | 6.9 | 63 | 0.7 | 6.6 | | 12 | 11.3 |
| 327.9 | 7.05 | 113 | 2.8 | 6.4 | | 12 | 13.0 |
| 348.8 | 7.5 | 140 | 1.0 | 5.3 | | 12½ | 9.8 |

A = % CAPCURE 3-800
B = CAPCURE 3-800 in g
C = % ELONGATION AT BREAK
D = % TENSILE SET AT BREAK
E = TENSILE STRENGTH (MPa)
F = % TENSILE SET
G = GEL TIME - (min)
H = BUTT TENSILE ADHESIVE STRENGTH (MPa)

It can be seen from column D of Table I that the % tensile set at break of the various compositions decreases considerably with increasing content of Capcure 3-800. Those compositions containing less than 20% Capcure 3-800 (based on the total weight of DMP30 and Laromin C260 in particular have high % tensile set at break, indicating that they are plastic rather than elastic. On the other hand, for example, the composition containing 139.5% Capcure 3-800 has a very low % tensile set at break indicating its elastic nature which is necessary for an adhesive or sealing composition.

There is a similar decrease in the % elongation at break with increasing Capcure 3-800 content indicating the curing properties of Capcure 3-800.

In addition, there is a marked decrease in gel time with increasing Capcure 3-800 content.

We claim:

1. A composition comprising two components as a mixture comprises: a first component comprising a mixture of a constituent (a) being an amine curable epoxy resin, and a constituent (b) being an isocyanate prepolymer with ether and blocked urethane groups, wherein the amount of constituent (a) comprises from 29 to 52 percent by weight of constituents (a) and (b), and the amount of constituent (b) comprises from 48 to 71 percent by weight of the total weight of constituents (a) and (b), and a second component comprising a mixture of constituent (c) being a suitable amine hardener, constituent (d) being a tertiary amine as a primary accelerator, and constituent (e) being a mercaptan terminated polymer as secondary accelerator, wherein the amount of constituent (c) comprises from 0.3 to 47 percent by weight of the total weight of constituent (a) and (b), the amount of constituent (d) comprises from 1 to 27 percent by weight of the total weight of constituents (a) and (b), and the amount of constituent (e) comprises from 63 to 293 percent by weight of the total weight of constituents (c) and (d), the first component and the second component being blendable together to form an adhesive or sealing composition.

2. A composition according to claim 1 wherein the amount of constituent (e) in the second component comprises from 90 to 230 percent by weight of the total weight of constituents (c) and (d).

3. A composition according to claim 1 wherein the amount of constituent (a) in the first component comprises from 34 to 45 percent by weight of the total weight of constituents (a) and (b), and the amount of constituent (b) in the first component comprises from 55 to 66 percent by weight of the total weight of constituents (a) and (b).

4. A composition according to claim 3 wherein the amount of constituent (a) in the first component comprises approximately 40 percent by weight of the total weight of constituents (a) and (b) and the amount of constituent (b) in the first component comprises approximately 60 percent by weight of the total weight of constituents (a) and (b).

5. A composition according to claim 1 wherein the amount of constituent (d) in the second component comprises from 3 to 27 percent by weight of the total weight of constituents (a) and (b).

6. A composition according to claim 5 wherein the amount of constituent (d) in the second component comprises from 6 to 8 percent by weight of the total weight of constituents (a) and (b).

7. A composition according to claim 1 wherein constituent (a) comprises an amine curable epoxy resin made from bisphenol A and epichlorohydrin.

8. A composition according to claim 1 wherein constituent (c) is an amine hardener selected from
  (a) a cycloaliphatic diamine,
  (b) isophorone diamine,
  (c) trimethyl hexamethylene diamine,
  (d) bis(amino propyl)piperazine,
  (e) diethylene triamine,
  (f) triethylene tetraamine,
  (g) and mixtures and adducts of isophorone diamine, diethylene triamine and triethylene tetramine.

9. A composition according to claim 8 wherein the amount of constituent (c) in the second component comprises from 0.3 to 16.7 percent by weight of the total weight of constituents (a) and (b).

10. A composition according to claim 8 wherein the amount of constituent (c) in the second component comprises from 6 to 7 percent by weight of the total weight of constituents (a) and (b).

11. A composition according to claim 1 wherein constituent (c) is an amine hardener being a compound of a cycloaliphatic diamine with alkyl phenol.

12. A composition according to claim 11 wherein the amount of constituent (c) in the second component comprises from 0.3 to 43.3 percent by weight of the total weight of constituents (a) and (b).

13. A composition according to claim 11 wherein the amount of constituent (c) in the second component comprises from 10 to 20 percent by weight of the total weight of constituents (a) and (b).

14. A composition according to claim 1 wherein constituent (d) is a tertiary amine selected from 2,4,6-tri(dimethyl aminomethyl)phenol, and dimethylaminomethyl phenol.

* * * * *

UNITED STATES PATENT AND TRADEMARK OFFICE
CERTIFICATE OF CORRECTION

PATENT NO. : 4,623,702
DATED : November 18, 1986
INVENTOR(S) : Richard Grieves et al It is certified that error appears in the above—identified patent and that said Letters Patent is hereby corrected as shown below:

Title page, paragraph [73]: Cancel "Pratley Investments Limited" and insert --Pratley Investments (Proprietary) Limited--.

Signed and Sealed this

Eighth Day of September, 1987

Attest:

DONALD J. QUIGG

*Attesting Officer*  *Commissioner of Patents and Trademarks*